United States Patent
Kawanaka et al.

(10) Patent No.: US 10,387,781 B2
(45) Date of Patent: *Aug. 20, 2019

(54) INFORMATION PROCESSING USING PRIMARY AND SECONDARY KEYWORD GROUPS

(71) Applicant: International Business Machines Corporation, Armonk, NY (US)

(72) Inventors: Risa Kawanaka, Tokyo (JP); Issei Yoshida, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 499 days.

This patent is subject to a terminal disclaimer.

(21) Appl. No.: 14/747,011

(22) Filed: Jun. 23, 2015

(65) Prior Publication Data

US 2015/0286930 A1   Oct. 8, 2015

Related U.S. Application Data

(63) Continuation of application No. 14/635,210, filed on Mar. 2, 2015.

(30) Foreign Application Priority Data

Mar. 27, 2014  (JP) .................. 2014-067158

(51) Int. Cl.
*G06N 5/00* (2006.01)
*G06N 5/02* (2006.01)
(Continued)

(52) U.S. Cl.
CPC ............ *G06N 5/022* (2013.01); *G06F 16/35* (2019.01); *G06N 5/003* (2013.01); *G06N 5/048* (2013.01)

(58) Field of Classification Search
None
See application file for complete search history.

(56) References Cited

U.S. PATENT DOCUMENTS

| | | | |
|---|---|---|---|
| 8,738,617 B2* | 5/2014 | Brown | G06F 17/30654 706/12 |
| 2005/0010458 A1* | 1/2005 | Holloway | G06F 17/30575 707/609 |

(Continued)

FOREIGN PATENT DOCUMENTS

| | | |
|---|---|---|
| JP | 2006099754 A | 4/2006 |
| JP | 2010237864 A | 10/2010 |
| JP | 2013250653 A | 12/2013 |

OTHER PUBLICATIONS

Kim et al, Collaborative filtering based on collaborative tagging, 2010.*

(Continued)

*Primary Examiner* — Li B. Zhen
*Assistant Examiner* — Mikayla Chubb
(74) *Attorney, Agent, or Firm* — Timothy J. Singleton

(57) ABSTRACT

An information processing device includes a keyword acquiring unit configured to acquire a plurality of primary keyword and secondary keyword groups; a classifying unit configured to classify each of the plurality of secondary keywords by a plurality of topics; an estimating unit configured to estimate whether or not each primary keyword in the plurality of groups is a related keyword related to any topic having a classified secondary keyword or a mixed keyword unrelated to any of the topics; and an assigning unit configured to preferentially assign a primary keyword estimated to be a related keyword to a topic having a classified secondary keyword in the same group, and assigning a (Continued)

primary keyword estimated to be a mixed keyword to any of all the topics given for classification.

6 Claims, 11 Drawing Sheets

(51) Int. Cl.
*G06N 5/04* (2006.01)
*G06F 16/35* (2019.01)

(56) References Cited

U.S. PATENT DOCUMENTS

| | | | | |
|---|---|---|---|---|
| 2007/0255671 | A1* | 11/2007 | Fox | G06N 3/0427 706/54 |
| 2007/0271279 | A1* | 11/2007 | Acharya | G06F 17/30598 |
| 2009/0037457 | A1* | 2/2009 | Musgrove | G06F 17/30731 |
| 2009/0204596 | A1* | 8/2009 | Brun | G06F 17/278 |
| 2012/0330869 | A1* | 12/2012 | Durham | G06N 5/022 706/16 |
| 2013/0018828 | A1* | 1/2013 | He | G06N 5/022 706/12 |
| 2015/0142704 | A1* | 5/2015 | London | G06N 5/04 706/11 |
| 2015/0199359 | A1* | 7/2015 | Chilakamarri | G06F 17/30731 707/728 |

OTHER PUBLICATIONS

Lo et al, Automatically Building a Stopword List for an Information Retrieval System, 2005.*

Rosemblat et al, A methodology for extending domain coverage in SemRep, 2013.*

Chuang et al, A Practical Web-based Approach to Generating Topic Hierarchy for Text Segments, 2004.*

Paisley et al, The Discrete Infinite Logistic Normal Distribution for Mixed-Membership Modeling, 2011.*

Blei et al, The Nested Chinese Restaurant Process and Bayesian Nonparametric Inference of Topic Hierarchies, 2010.*

Kataria et al, Entity Disambiguation with Hierarchical Topic Models, 2011.*

List of IBM Patents or Patent Applications Treated as Related; Date File: Jun. 23, 2015, pp. 1-2.

Risa Kawanaka, et al.,"Information Processing Using Primary and Secondary Keyword Groups," U.S. Appl. No. 14/635,210, filed Mar. 2, 2015.

Blei et al., "Modeling Annotated Data," Proceedings of the 26th Annual International ACM SIGIR Conference on Research and Development in Information Retrieval, Aug. 2003, 8 pages.

Iwata et al., Modeling Noisy Annotated Data with Application to Social Annotation, IEEE Transactions on Knowledge and Data Engineering, vol. 25, No. 7, Jul. 2013, pp. 1601-1613.

* cited by examiner

Primary User Data

Secondary User Data

3rd Overall Data Set λ

1st Overall Data Set ψ

2nd Overall Data Set φ

3rd User Data θ

Primary Keyword Generation Probability

INFORMATION PROCESSING USING PRIMARY AND SECONDARY KEYWORD GROUPS

DOMESTIC AND FOREIGN PRIORITY

This application is a continuation of U.S. patent application Ser. No. 14/635,210, filed Mar. 2, 2015, which claims priority to Japanese Patent Application No. 2014-067158, filed Mar. 27, 2014, and all the benefits accruing therefrom under 35 U.S.C. § 119, the contents of which in its entirety are herein incorporated by reference.

BACKGROUND

The present invention relates generally to an information processing and, more particularly, to information processing using primary and secondary keyword groups.

Many social media services provide summary fields such as profiles to introduce the content of each account and encourage subscription. The keywords included in these summary fields are collected and used for marketing purposes. However, many accounts do not provide much information in their summary fields, and this impedes the comprehensive collection and analysis of user information using the summary field.

In order to solve this problem, a method has been disclosed in which the co-occurrence relationship between keywords in the content and keywords in the summary are learned, and the content of keywords in the summary is estimated based on keywords in the content (see, for example, David Blei and Michael Jordan, "Modeling Annotated Data," Proc. of ACM SIGIR, 2003).

However, this method is limited to user descriptions in the summary field corresponding to content, and keywords in the summary often do not correspond to the content. For example, a user may mention interests such as reading and sports in the summary field, but only discusses reading in the content and almost never mentions sports. In this case, the summary field includes both a related keyword (reading) that actually corresponds to content and a mixed keyword (sports) that does not correspond to the content, and the presence of the mixed keyword impedes the learning of co-occurrence relationships.

A method has been disclosed to address this problem, in which a topic model associating keywords with topics is introduced, and a special mixed keyword topic is assigned to mixed keywords in order to exclude mixed keywords from the related keywords (see, for example, Tomoharu Iwata, Takeshi Yamada, Naonori Ueda, "Modeling Noisy Annotated Data with Application to Social Annotation," IEEE Transactions on Knowledge and Data Engineering, Vol. 25, No. 7, pp. 1601-1613, 2013).

Through this method, keywords commonly used by users that are not directly related to content such as "favorite" and "read later" are excluded as mixed keywords. However, in this method, keywords that are related keywords for some readers, such as "sports", are treated as mixed keywords for all users. As a result, a keyword determined to be a mixed keyword for one reader cannot be used to accurately glean the situation for another user in which the keyword is a related keyword, and the learning accuracy for co-occurrence relationships between keywords in content and keywords in summary fields cannot be sufficiently improved.

SUMMARY

In one embodiment, an information processing device includes a keyword acquiring unit configured to acquire a plurality of primary keyword and secondary keyword groups; a classifying unit configured to classify each of the plurality of secondary keywords by a plurality of topics; an estimating unit configured to estimate whether or not each primary keyword in the plurality of groups is a related keyword related to any topic having a classified secondary keyword or a mixed keyword unrelated to any of the topics; and an assigning unit configured to preferentially assign a primary keyword estimated to be a related keyword to a topic having a classified secondary keyword in the same group, and assigning a primary keyword estimated to be a mixed keyword to any of all the topics given for classification.

In another embodiment, an information processing method executed by a computer includes acquiring a plurality of primary keyword and secondary keyword groups; classifying each of the plurality of secondary keywords by a plurality of topics; estimating whether or not each primary keyword in the plurality of groups is a related keyword related to any topic having a classified secondary keyword or a mixed keyword unrelated to any of the topics; and assigning a primary keyword estimated to be a related keyword to a topic having a classified secondary keyword in the same group, and assigning a primary keyword estimated to be a mixed keyword to any of the topics for classification.

In another embodiment, a non-transitory, computer readable storage medium having instructions stored thereon that when executed by a computer, implement an information processing method. The method includes acquiring a plurality of primary keyword and secondary keyword groups; classifying each of the plurality of secondary keywords by a plurality of topics; estimating whether or not each primary keyword in the plurality of groups is a related keyword related to any topic having a classified secondary keyword or a mixed keyword unrelated to any of the topics; and assigning a primary keyword estimated to be a related keyword to a topic having a classified secondary keyword in the same group, and assigning a primary keyword estimated to be a mixed keyword to any of the topics for classification.

DETAILED DESCRIPTION

Embodiments of the present invention to learn the proper co-occurrence relationship between a keyword in content and a keyword in a summary by performing the appropriate processing on a keyword in a summary which may be either a related keyword or a mixed keyword.

The information processing device in an aspect of the present invention includes: a keyword acquiring unit for acquiring a plurality of primary keyword and secondary keyword groups; a classifying unit for classifying each of the plurality of secondary keywords by a plurality of topics; an estimating unit for estimating whether or not each primary keyword in the plurality of groups is a related keyword related to any topic having a classified secondary keyword or a mixed keyword unrelated to any of the topics; and an assigning unit for preferentially assigning a primary keyword estimated to be a related keyword to a topic having a classified secondary keyword in the same group, and assigning a primary keyword estimated to be a mixed keyword to any of the topics for classification.

The following is an explanation of the present invention with reference to a preferred embodiment of the present invention. However, the present embodiment does not limit the present invention in the scope of the claims. Also, all combinations of characteristics explained in the embodiment are not necessarily required in the technical solution of the present invention.

Figure 1:
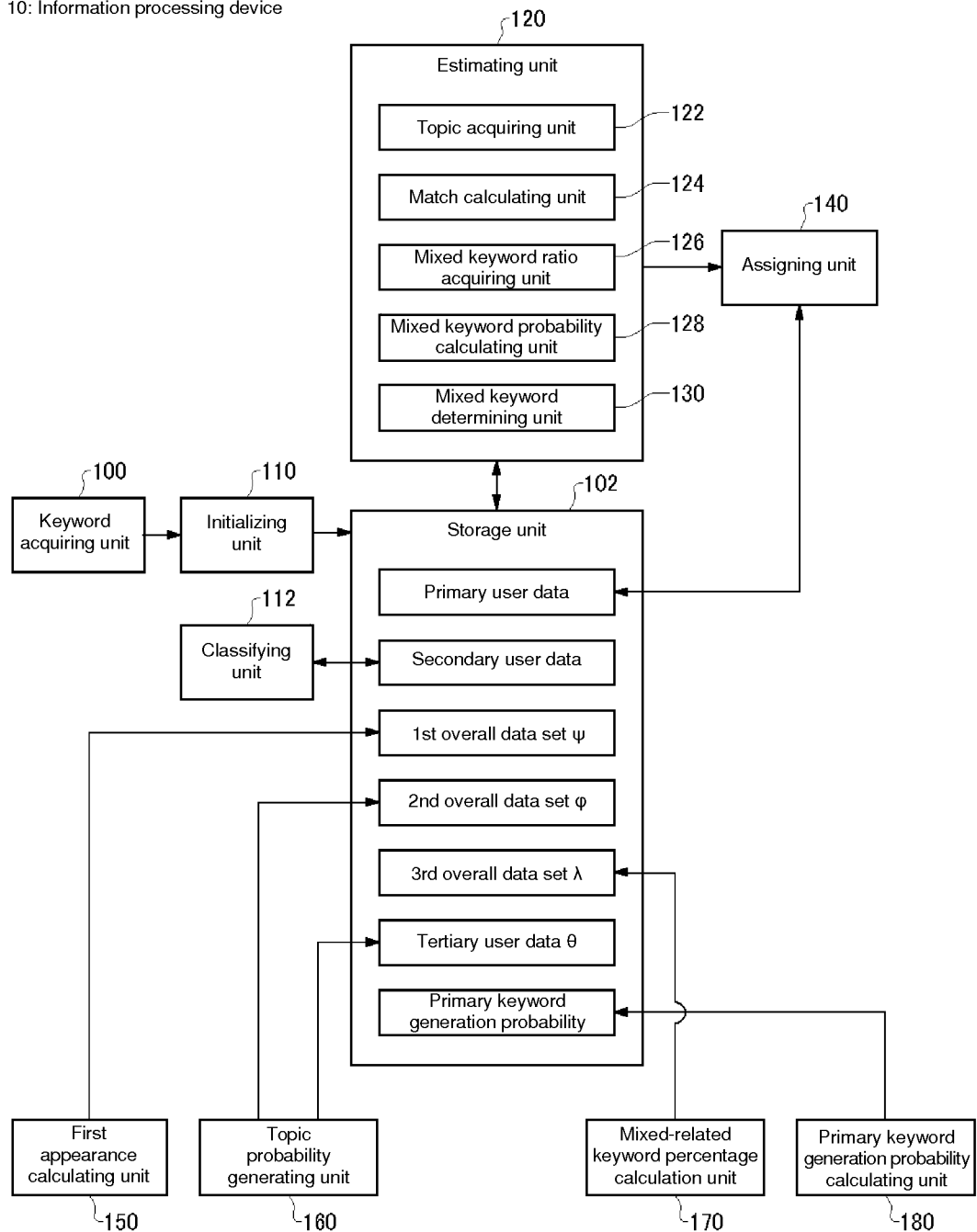
FIG. 1 is a block diagram of an information processing device in an embodiment of the present invention.

FIG. 1 is a block diagram of an information processing device 10 in the present embodiment. The information processing device 10 in the present embodiment acquires summary fields and content groupings from social media services, etc., and learns the primary keywords included in the summary fields and the co-occurrence relationships with secondary keywords in the content.

The information processing device 10 learns the co-occurrence relationships between primary keywords and secondary keywords on the basis of a topic model. For example, the information processing device 10 assigns topics to primary keywords and secondary keywords. A topic may be a unit for grouping a plurality of keywords with a high probability of appearing together in document information. Examples include themes common to a plurality of keywords or corresponding to a given topic.

The information processing device 10 includes a keyword acquiring unit 100, a storage unit 102, an initializing unit 110, a classifying unit 112, an estimating unit 120, an assigning unit 140, a primary keyword appearance calculating unit 150, a topic probability generating unit 160, a mixed-related keyword percentage calculation unit 170, and a primary keyword generation probability calculating unit 180.

From a plurality of accounts, the keyword acquiring unit 100 acquires primary document information, which can be the summary field of a social media service including one or more primary keywords created by the user, and acquires secondary document information, which can be content corresponding to the summary field which includes one or more secondary keywords. The keyword acquiring unit 100 acquires groups of primary keywords and secondary keywords by extracting primary keywords from primary document information and secondary keywords from secondary document information corresponding to primary document information.

The keyword acquiring unit 100 extracts one or more primary keywords from primary document information and secondary keywords from secondary document information corresponding to the primary document information to generate both groups of keywords for each account. The keyword acquiring unit 100 supplies the groups of primary keywords and secondary keywords to the initializing unit 110.

The storage unit 102 stores data used by the information processing device 10. For example, the storage unit 102 stores primary user data which indicates the assignment of topics to primary keywords for each user and whether each primary keyword is a mixed keyword or related keyword, secondary user data indicating the assignment of topics to the secondary keywords for each user, a third overall data set $\theta$ indicating the topic generation probabilities for each user, a first overall data set $\Psi$ indicating the primary keyword generation probability for each topic for all users, a second overall data set $\Phi$ indicating the secondary keyword generation probability for each topic for all users, a third overall data set $\lambda$ indicating the ratio of mixed keywords in all primary keywords for all users, and primary keyword generation probabilities indicating the probability of primary keywords being generated in secondary document information.

When the information processing device 10 begins the processing sequence, the initializing unit 110 assigns topics to primary keywords and secondary keywords using predefined rules (for example, random), and generates initialized primary user data and secondary user data. The initializing unit 110 stores the generated primary user data and secondary user data in the storage unit 102.

The classifying unit 112 classifies each secondary keyword by topic. For example, the classifying unit 112 acquires secondary user data from the storage unit 102, reclassifies the secondary keywords in the secondary user data by topic, and stores the results of the reclassification in the storage unit 102 as secondary user data.

The estimating unit 120 estimates whether each primary keyword in the groups received from the keyword acquiring unit 100 is a related keyword related to a topic used to classify a secondary keyword, or an unrelated mixed keyword. For example, the estimating unit 120 estimates whether or not a primary keyword is a related keyword or a mixed keyword based on primary topics assigned to primary keywords or secondary topics assigned to secondary keywords. The estimating unit 120 includes a topic acquiring unit 122, a match calculating unit 124, a mixed keyword ratio acquiring unit 126, a mixed keyword probability calculating unit 128, and a mixed keyword determining unit 130.

The topic acquiring unit 122 acquires the primary topics currently assigned to the primary keywords of a user by referencing primary user data in the storage unit 102.

The match calculating unit 124 calculates an extent of topic match as the ratio of topics identical to primary topics among the secondary topics currently assigned to the secondary keywords of a user by referencing the secondary user data in the storage unit 102.

The mixed keyword ratio acquiring unit 126 acquires a mixture ratio as the estimated ratio of mixed keywords among the primary keywords included in the primary document information of all users on the basis of the third overall data set $\lambda$ in the storage unit 102.

The mixed keyword probability calculating unit 128 calculates the mixed keyword probability that a primary keyword is a mixed keyword and the related keyword probability that a primary keyword is a related keyword on the basis of the extent of topic match calculated by the match calculating unit 124 and the mixture ratio acquired by the mixed keyword ratio acquiring unit 126. The specific method of calculation used by the mixed keyword probability calculating unit 128 is described later in greater detail.

The mixed keyword determining unit 130 determines whether a primary keyword is a related keyword or mixed keyword on the basis of the mixed keyword probability calculated by the mixed keyword probability calculating unit 128. For example, the mixed keyword determining unit 130 determines that a primary keyword is a mixed keyword based on a probability equal to the mixed keyword probability, and determines that a primary keyword is a related keyword based on a probability equal to the relation keyword probability. The mixed keyword determining unit 130 updates the first user data in the storage unit 102 based on the results indicating whether a primary keyword is a related keyword or mixed keyword.

The assigning unit 140 assigns a primary keyword estimated to be a related keyword to a topic used to classify a secondary keyword in the same group on a priority basis, and assigns a primary keyword estimated to be a mixed keyword to a topic available for classification. For example, the assigning unit 140 may acquire secondary user data from the storage unit 102, and assign a primary keyword to a topic on the basis of the secondary user data. Specific details related to the assignment of topics by the assigning unit 140 are explained later in greater detail. The assigning unit 140 updates the primary user data in the storage unit 102 to reflect the topic assigned to the primary keyword.

The primary keyword appearance calculating unit 150 calculates the likelihood of a given primary keyword in each topic appearing in primary document information from all users. The primary keyword appearance calculating unit 150 stores in the storage unit 102 a first overall data set $\psi$ in which the likelihood of primary keywords appearing has been recorded by topic.

The topic probability generating unit 160 generates the probability of each topic in the secondary document information of each user being generated. The topic probability generating unit 160 stores in the storage unit 102 a tertiary user data $\theta$ in which the topic generation probability has been recorded by a user.

The topic probability generating unit 160 also calculates the likelihood of a given secondary keyword in each secondary topic appearing in secondary document information from all users. The topic probability generating unit 160 stores in the storage unit 102 a second overall data set $\Phi$ in which the likelihood of secondary keywords appearing has been recorded by secondary topic.

The mixed-related keyword percentage calculation unit 170 generates a third overall data set $\lambda$ indicating the ratio of mixed keywords among all primary keywords for all users, and stores this data set in the storage unit 102.

The primary keyword generation probability calculating unit 180 calculates a primary keyword generation probability indicating the probability that a primary keyword has been assigned to secondary document information. For example, the primary keyword generation probability calculating unit 180 calculates a primary keyword generation probability on the basis of the tertiary user data $\theta$ and the first overall data set $\Psi$. The primary keyword generation probability calculating unit 180 stores primary keyword generation probabilities in the storage unit 102.

The information processing device 10 in the present embodiment can estimate primary keywords used in a summary corresponding to content using primary keyword generation probabilities calculated by the primary keyword generation probability calculating unit 180. When a primary keyword is a mixed keyword, the information processing device 10 does not assign a dedicated mixed keyword topic to the primary keyword, but simply assigns any topic to the primary keyword.

In this way, the information processing device 10 can later assign the appropriate topic to the primary keyword when the primary keyword is a mixed keyword for one user and a related keyword for another user. As a result, the accuracy of primary keyword estimations can be improved.

Figure 2:
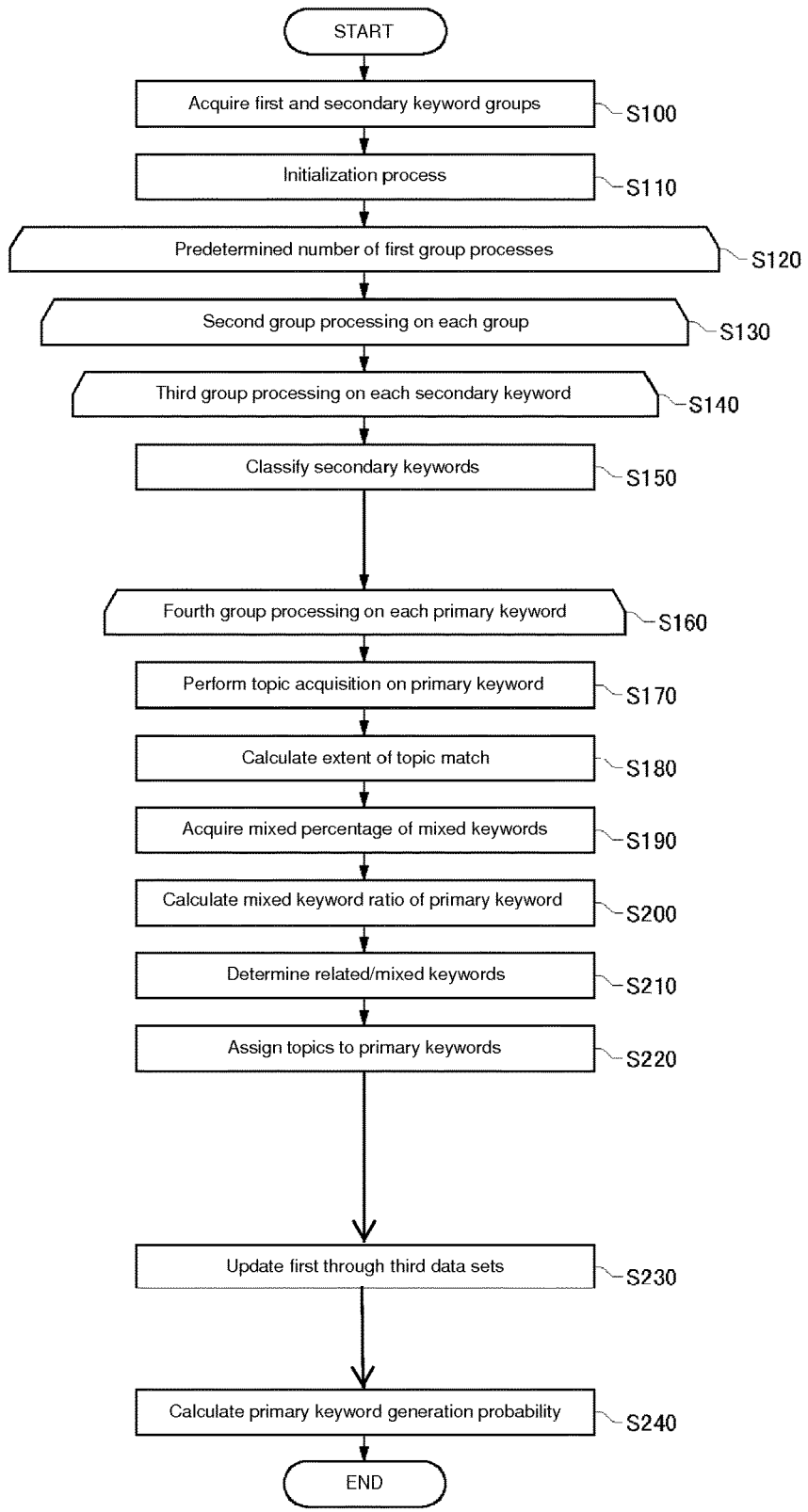
FIG. 2 is a flowchart of processing performed by the information processing device 10 in the embodiment of the present invention.

FIG. 2 is a flowchart of processing performed by the information processing device 10 in the embodiment of the present invention. In the present embodiment, the information processing device 10 executes the processing in Operations S100 through S240.

First, in Operation S100, the keyword acquiring unit 100 acquires groups of primary keywords and secondary keywords. For example, the keyword acquiring unit 100 acquires information posted by users on a social media site, a blogging site and/or some other site from the storage unit 102 or a database external to the information processing device 10.

Next, the keyword acquiring unit 100 acquires, as primary document information, summary fields or text introducing content or a user such as a user profile, and acquires, as secondary document information, content from posted information.

Figure 3:
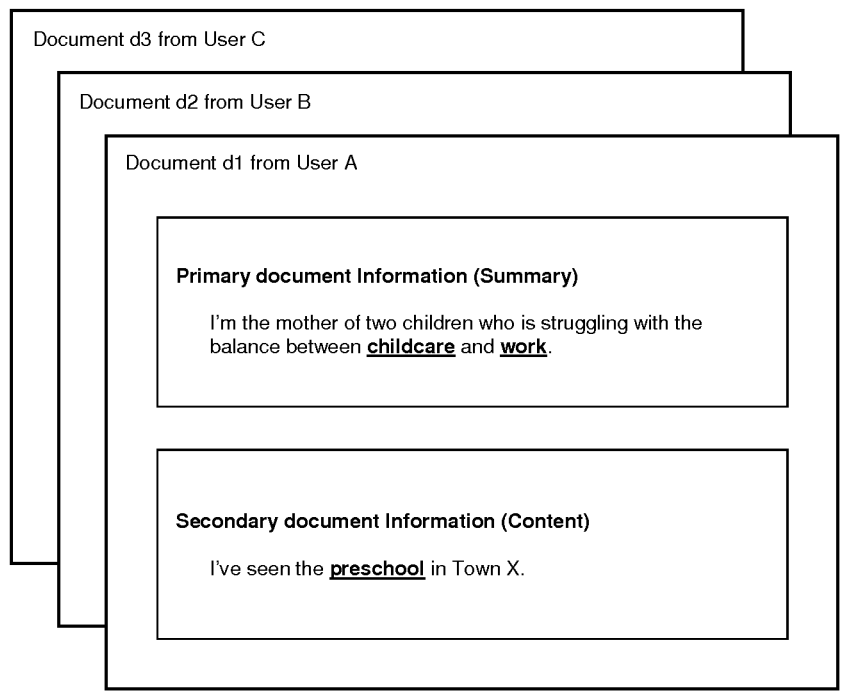
FIG. 3 is an example of primary document information and secondary document information acquired by the keyword acquiring unit 100.

FIG. 3 is an example of primary document information and secondary document information acquired by the keyword acquiring unit 100. As shown in the drawing, the keyword acquiring unit 100 acquires documents from users containing primary document information and secondary document information. As shown in the drawing, the keyword acquiring unit 100 acquires Documents d1-d3 containing summary fields (primary document information) and other content (secondary document information) posted to a social media service by users A-C.

The keyword acquiring unit 100 acquires, as primary keywords, words included in the primary document information. For example, as shown in the drawing, when the text "I'm the mother of two children who is struggling with the balance between childcare and work" has been acquired as primary document information from User A, the keyword acquiring unit 100 may acquire "childcare", "work", "struggling", "two children" and "mother" as primary keywords. When the primary document information is a list of words such as tags, the keyword acquiring unit 100 may acquire each of the tags as primary keywords.

The keyword acquiring unit 100 then acquires words included in secondary document information as secondary keywords. For example, as shown in the drawing, when the text "I've seen the preschool in Town X" as secondary document information from User A, the keyword acquiring unit 100 may acquire "Town X" and "preschool" as secondary keywords.

The keyword acquiring unit 100 forms the primary keywords and secondary keywords acquired from a user into groups. For example, a primary keyword such as "childcare" acquired in Document d1 from User A is grouped with a secondary keyword such as "Town X". The keyword acquiring unit 100 supplies these groups of primary keywords and secondary keywords to the classifying unit 112, the estimating unit 120, and the initializing unit 110.

Returning to FIG. 2, in Operation S110, the initializing unit 110 initializes the primary user data and secondary user data. For example, the initializing unit 110 randomly assigns one of K topics (where K is a predetermined integer equal to or greater than 2) to each of the primary keywords acquired from the keyword acquiring unit 100, and generates primary user data in which a related keyword or mixed keyword is randomly assigned to each primary keyword.

The initializing unit 110 is set using predetermined adjustment parameters used by the process or values selected by the user of the information processing device 10. For example, the initializing unit 110 may be set to the values in parameters α, β, γ, and η.

Also, when the information processing device 10 begins the processing sequence, the initializing unit 110, for example, generates secondary user data in which one of K topics has been randomly assigned to each of the secondary keywords acquired from the keyword acquiring unit 100. The initializing unit 110 stores the primary user data and secondary user data generated in this way in the storage unit 102.

Figure 4:
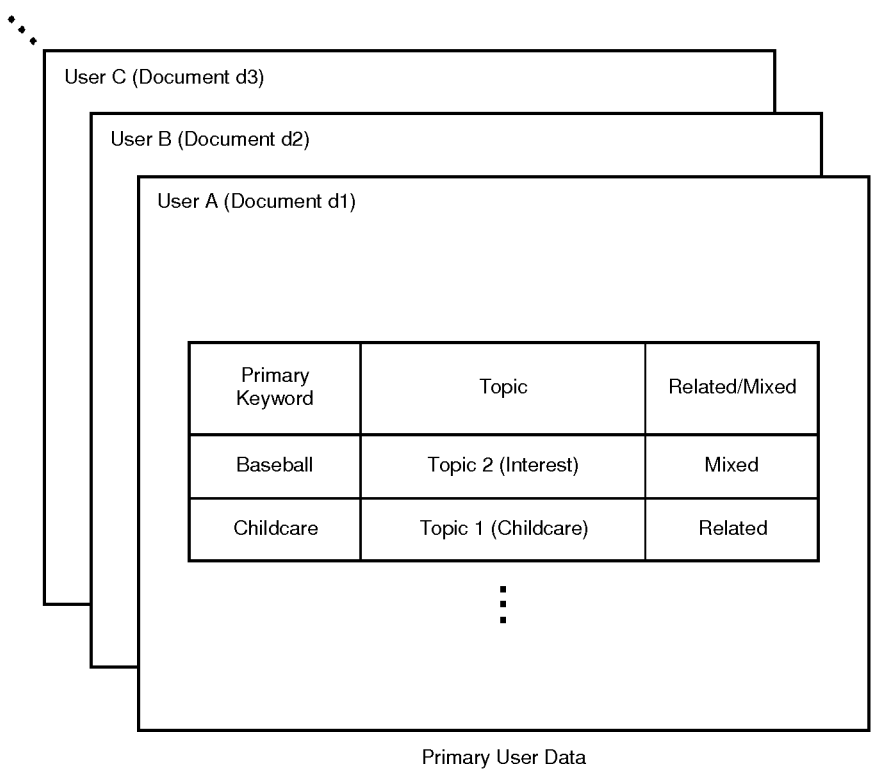
FIG. 4 is an example of primary user data stored in the storage unit 102.

FIG. 4 is an example of primary user data stored in the storage unit 102. As shown in the drawing, the storage unit 102 stores primary user data for each user A-C which includes one or more primary keywords, the topics assigned to the primary keywords, and information indicating whether a primary keyword is a related keyword or a mixed keyword.

For example, as shown in the drawing, the storage unit 102 holds as primary user data a record indicating that primary keyword "baseball" related to the primary document (User A) is a mixed keyword assigned to the secondary topic. In FIG. 4, the secondary topic is "interests". However, this is for explanatory purposes only, and the information processing device 10 may acquire and hold information related to the meaning of each topic.

Figure 5:
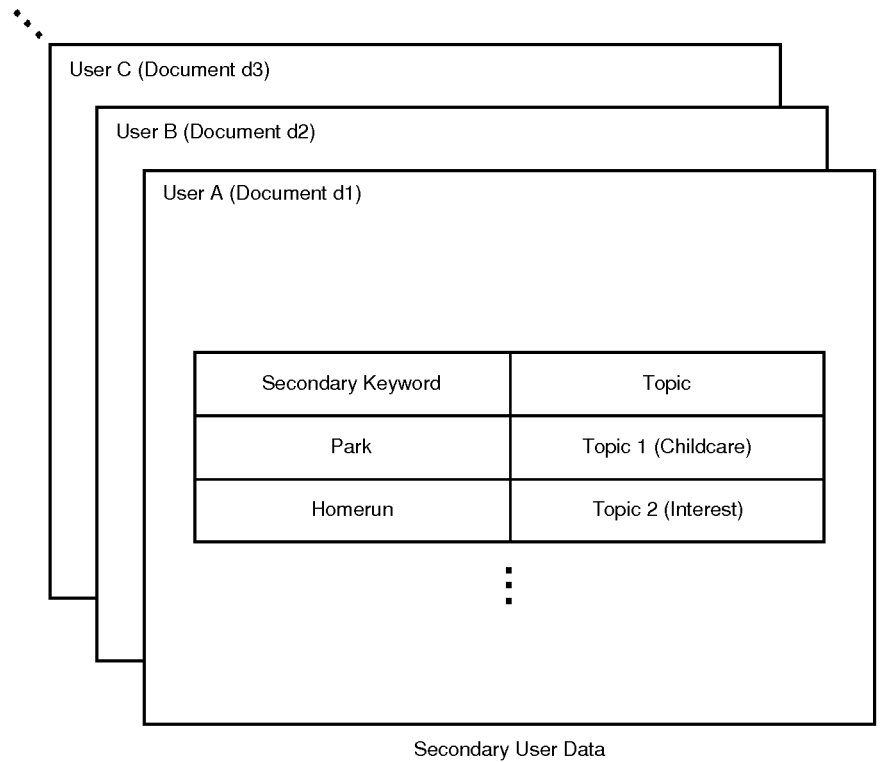
FIG. 5 is an example of secondary user data stored in the storage unit 102.

FIG. 5 is an example of secondary user data stored in the storage unit 102. As shown in the drawing, the storage unit 102 stores secondary user data for each user A-C which includes one or more secondary keywords and topics assigned to the secondary keywords.

For example, as shown in the drawing, the storage unit 102 holds as secondary user data a record indicating that secondary keyword "park" in the primary document (User A) has been assigned to a primary topic.

Returning to FIG. 2, in Operation S120, the information processing device 10 executes first loop processing from Operation S130 to S230 a predetermined number of times.

In Operation S130 of the first loop processing, the information processing device 10 executes the second loop processing from Operation S140 to S220 on each of the primary keywords and secondary keywords. In other words, the information processing device 10 executes the second loop processing on each user. In this explanation, the second loop processing is executed on the $d^{th}$ user (user d).

When groups of primary document information and secondary document information have been generated for a user (for example, when a single user has generated a blog entry on multiple accounts), the information processing device 10 may execute the second loop processing on each group of primary document information and secondary document information. In other words, here, the information processing device 10 executes the second loop processing several times on a single user.

In Operation S140 of the second loop processing, the information processing device 10 executes third loop processing including Operation S150 on each of the secondary keywords. In the following explanation, the third loop processing is executed on the $j^{th}$ secondary keyword $w_j$.

In Operation S150 of the third loop processing, the classifying unit 112 determines the secondary topic $z_j$ to be assigned to the secondary keyword $w_j$ for user d by classifying the secondary keyword $w_j$ using a plurality of topics. For example, the classifying unit 112 determines that secondary topic $z_1$ is to be assigned to secondary keyword $w_1$ "Town X" related to User A in FIG. 3, and that secondary topic $z_2$ is to be assigned to secondary keyword $w_2$ "preschool".

The classifying unit 112 determines which topic to assign to a secondary keyword on the basis of the number of secondary keywords $w_j$ from the user assigned to a single secondary topic, the number of secondary keywords from the user, the number of single secondary keywords assigned to a single topic, the number of secondary keywords assigned to a single topic, and the overall number of secondary keywords for all users.

In one example, the classifying unit 112 acquires the primary user data and secondary user data from the storage unit 102, and determines the topic $z_j$ using Equation (1). In other words, the classifying unit 112 assigns the $k^{th}$ topic ($1 \le k \le K$) to the jth secondary keyword $w_j$ using the probability on the left side $P(z_j = k | W, T, Z_{\setminus j}, C, R)$, which is proportional to the right side of Equation (1).

Equation 1

$$P(z_j = k \mid W, T, Z_{\setminus j}, C, R) \propto \frac{N_{kd\setminus j} + \alpha}{N_{d\setminus j} + \alpha K} \frac{N_{kw_j\setminus j} + \beta}{N_{k\setminus j} + \beta W} \left( \frac{N_{kd\setminus j} + 1}{N_{kd\setminus j}} \right)^{M_{kd}^{\gamma}} \quad \text{Equation (1)}$$

Here, $N_{kd\setminus j}$ represents the number of times the $k^{th}$ topic k has been generated by a secondary keyword in the secondary document information of the $d^{th}$ user d (excluding the $j^{th}$ secondary keyword $w_j$), and $N_{d\setminus j}$ represents the total number of secondary keywords in the secondary document information of user d (excluding the $j^{th}$ secondary keyword $w_j$). Also, $N_{kw_j\setminus j}$ represents the number of times the $k^{th}$ topic k has generated the $j^{th}$ secondary keyword $w_j$, $N_{k\setminus j}$ represents the total number of secondary keywords generated by topic k (excluding the $j^{th}$ secondary keyword $w_j$), and W represents the number of different secondary keywords of all users.

Equation (1) is derived using a method similar to Non-Patent Literature 2 on the basis of Equation (2) through Equation (7).

Equation 2

$$P(Z, W, T, C, R, \alpha, \beta, \gamma, \eta) = \quad \text{Equation (2)}$$
$$P(Z \mid \alpha) P(W \mid Z, \beta) P(T \mid C, \gamma) P(R, \eta) P(C \mid Z, R)$$

Equation 3

$$P(Z \mid \alpha) = \left( \frac{\Gamma(\alpha K)}{\Gamma(\alpha)^K} \right)^D \prod_d \frac{\prod_k \Gamma(N_{kd} + \alpha)}{\Gamma(N_d + \alpha K)} \quad \text{Equation (3)}$$

$N_{kd}$ represents the number of times the $k^{th}$ topic k was generated by a secondary keyword in the secondary document information of the $d^{th}$ user d, K represents the total number of topics, and $N_d$ represents the total number of secondary keywords in the secondary document information of user d.

Equation 4

$$P(W \mid Z, \beta) = \left(\frac{\Gamma(\beta W)}{\Gamma(\beta)^W}\right)^K \prod_k \frac{\prod_w \Gamma(N_{kw} + \beta)}{\Gamma(N_k + \beta W)} \quad \text{Equation (4)}$$

$N_{kw}$ represents the number of times the $k^{th}$ topic k has generated the $w^{th}$ secondary keyword w, and $N_k$ represents the total number of secondary keywords generated by topic k.

Equation 5

$$P(T \mid C, \gamma) = \left(\frac{\Gamma(\gamma T)}{\Gamma(\gamma)^T}\right)^K \prod_{k=1}^{K} \frac{\prod_{t=1}^{T} \Gamma(M_{k,t} + \gamma)}{\Gamma(M_k + \gamma T)} \quad \text{Equation (5)}$$

$M_{k,t}$ represents the number of times the $t^{th}$ primary keyword has been generated from the $k^{th}$ topic k, $M_k$ represents the total number of primary keywords generated by the $k^{th}$ topic k, and T represents the number of different primary keywords for all users. Equation (4) in Non-Patent Literature 2, which corresponds to Equation (5), is different from Equation (5). This is because, in Non-Patent Document 2, it relies on topics for mixed keywords in addition to the normal K topics.

Equation 6

$$P(R \mid \eta) = \frac{\Gamma(2\eta)\Gamma(M_0 + \eta)\Gamma(M - M_0 + \eta)}{\Gamma(\eta)^2 \Gamma(M + 2\eta)} \quad \text{Equation (6)}$$

M represents the total number of primary keywords, $M_0$ represents the number of mixed keywords among the primary keywords of all users, and $\eta$ represents a predetermined parameter.

Equation 7

$$P(C \mid Z, R) = \prod_{d=1}^{D} \prod_{k=1}^{K} \left(\frac{1}{K}\right)^{M_{0,d}^{(k)}} \left(\frac{N_{k,d}}{N_d}\right)^{M_{1,d}^{(k)}} \quad \text{Equation (7)}$$

$M_{0,d}^{(k)}$ represents the number of mixed keywords generated by the $k^{th}$ topic k in the secondary document information of the $d^{th}$ user d, and $M_{1,d}^{(k)}$ represents the number of related keywords generated by the $k^{th}$ topic k in the secondary document information of the $d^{th}$ user d. Equation (6) in Non-Patent Literature 2, which corresponds to Equation (7), is different from Equation (7). This is because, in Non-Patent Document 2, it is premised on the direct influence of the related/mixed keyword determination R on the generation of primary keywords T. In the present invention, it is premised on an influence on the topics C of the primary keywords.

In Operation S160 of the second loop processing, the information processing device 10 executes fourth loop processing including Operations S170 through S220 on each primary keyword. In the following explanation, the fourth loop processing is executed on the $j^{th}$ primary keyword $t_j$.

In the fourth loop processing, the estimating unit 120 estimates whether the primary keyword $t_j$ is a related keyword or an unrelated mixed keyword, and the assigning unit 140 assigns a topic to the primary keyword $t_j$ on the basis of the results of the estimation.

In Operation S170 of the fourth loop processing, the topic acquiring unit 122 acquires a primary topic for a primary keyword $t_j$ of user d. For example, the topic acquiring unit 122 references the primary user data in the storage unit 102 to acquire as the primary topic the number of the topic currently assigned to the primary keyword $t_j$ for the user d. In one example, the topic acquiring unit 122 acquires primary topic $c_j$ when the $c_j^{th}$ topic has been acquired for the primary keyword $t_j$.

Next, in Operation S180, the match calculating unit 124 calculates the extent of the match, which is the ratio of topics identical to the primary topic $c_j$ among the secondary topics assigned to the secondary keywords of user d. For example, the match calculating unit 124 references the secondary user data in the storage unit 102 to acquire the topics currently assigned to the secondary keywords of user d as secondary topics, and then calculates, as the extent of the topic match, the ratio of topics identical to the primary topic $c_j$ among the secondary topics assigned to the secondary keywords of user d.

Next, in Operation S190, the mixed keyword ratio acquiring unit 126 acquires the mixed keyword ratio, which is the ratio of primary keywords in the primary document information of all users that contain mixed keywords. For example, the mixed keyword ratio acquiring unit 126 acquires a mixed keyword ratio from the third overall data set in the storage unit 102 which is correlated with the ratio of primary keywords of all users containing mixed keywords, and a related keyword ratio correlated with the ratio of primary keywords of all users containing related keywords.

For example, the mixed keyword ratio acquiring unit 126 acquires a mixed keyword ratio in which parameter $\eta$ is added to the total number $M_{0\backslash j}$ of mixed keywords among the primary keywords of all users (excluding the $j^{th}$ primary keyword $t_j$) to obtain the numerator, and $2\eta$ is added to the total number $M_{\backslash j}$ of primary keywords for all users (excluding the $j^{th}$ primary keyword $t_j$) to obtain the denominator.

The mixed keyword ratio acquiring unit 126 also acquires a related keyword ratio, which is the ratio of primary keywords in the primary document information of all users containing related keywords. For example, the mixed keyword ratio acquiring unit 126 acquires a related keyword ratio in which $\eta$ is added to the difference of $M_{\backslash j}$ and $M_{0\backslash j}$, which represents the total number of related keywords among the primary keywords of all users (excluding the $j^{th}$ primary keyword $t_j$), to obtain the numerator, and $2\eta$ is added to $M_{\backslash j}$ to obtain the denominator.

Figure 6:
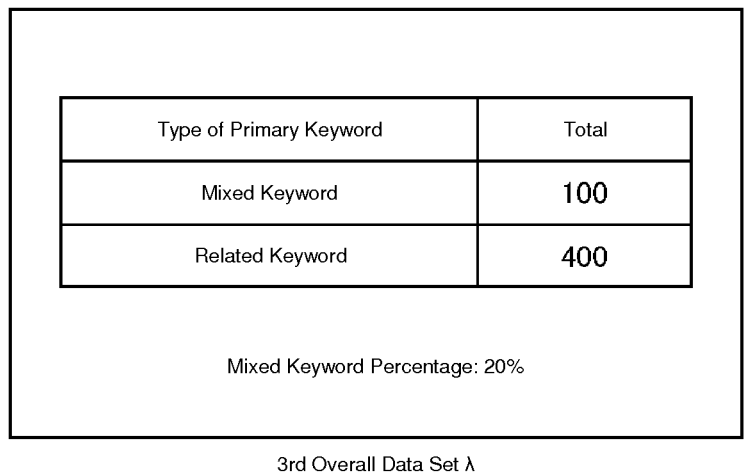
FIG. 6 is an example of a third overall data set λ acquired by the mixed keyword ratio acquiring unit 126.

FIG. 6 is an example of a third overall data set $\lambda$ acquired by the mixed keyword ratio acquiring unit 126. As shown in the drawing, the storage unit 102 may store a third overall data set $\lambda$ including the total number of mixed keywords and related keywords in the primary keywords of all users. Here, the storage unit 102 may store a third overall data set $\lambda$ including the mixed keyword ratio of mixed keywords containing $\eta$ and not containing $\eta$.

Returning to FIG. 2, in Operation S200, the mixed keyword probability calculating unit 128 calculates the mixed keyword probability of primary keyword $t_j$ being a mixed keyword and the related keyword probability of primary keyword $t_j$ being a related keyword on the basis of the extent of topic match calculated by the match calculating unit 124 in Operation S180, and the mixed keyword ratio obtained by the mixed keyword ratio acquiring unit 126 in Operation S190.

The mixed keyword probability calculating unit 128 may calculate the mixed keyword probability and related keyword probability of a primary keyword on the basis of the total number of mixed keywords among the primary keywords of all users, the total number of primary keywords of all users, the total number of secondary keywords of the $d^{th}$ user d, the total number of primary keywords assigned a primary topic for the $d^{th}$ user d, and the total number of topics.

In one example, the mixed keyword probability calculating unit 128 acquires primary user data and secondary user data from the storage unit 102, and determines the probability that the $j^{th}$ primary keyword $t_j$ is a mixed keyword using Equation (8) and Equation (9). For example, the mixed keyword probability calculating unit 128 calculates the right side of Equation (8) and the right side of Equation (9), and normalizes the sum of both to 1 in order to calculate the mixed keyword probability that the primary keyword $t_j$ is a mixed keyword $P(r_j=0|Z, W, T, C, R_{\setminus j}; \alpha, \beta, \gamma, \eta)$, and the related keyword probability that the primary keyword $t_j$ is a related keyword $P(r_j=1|Z, W, T, C, R_{\setminus j}; \alpha, \beta, \gamma, \eta)$.

Equation 8

$$P(r_j = 0 \mid Z, W, T, C, R_{\setminus j}, \alpha, \beta, \gamma, \eta) = \frac{M_{0 \setminus j} + \eta}{M_{\setminus j} + 2\eta} \frac{1}{K} \quad \text{Equation (8)}$$

Equation 9

$$P(r_j = 1 \mid Z, W, T, C, R_{\setminus j}, \alpha, \beta, \gamma, \eta) = \frac{M_{\setminus j} - M_{0 \setminus j} + \eta}{M_{\setminus j} + 2\eta} \frac{N_{c_j,d}}{N_d} \quad \text{Equation (9)}$$

M represents the total number of primary keywords, $M_0$ represents the number of mixed keywords among the primary keywords of all users, and $\eta$ is a predetermined parameter. $M_{0\setminus j}$ represents the total number of mixed keywords among the primary keywords of all users (excluding the $j^{th}$ primary keyword $t_j$), $M_{\setminus j}$ represents the total number of primary keywords for all users (excluding the $j^{th}$ primary keyword $t_j$), and $c_j$ represents the number of the primary topic obtained by the topic acquiring unit 122 in Operation S170.

The term $(M_{0\setminus j}+\eta)/(M_{\setminus j}+2\eta)$ in Equation (8) represents the mixed keyword ratio calculated by the mixed keyword acquiring unit 126 in Operation S190, and the term $(M_{\setminus j}-M_{0\setminus j}+\eta)/(M_{d\setminus j}+2\eta)$ in Equation (9) represents the related keyword ratio. Also, $N_{c_j,d}$ in Equation (9) represents the total number of topics $c_j$ generated by the secondary keywords of the $d^{th}$ user d, and $N_{c_j,d}/N_d$ corresponds to the extent of topic match calculated by the match calculating unit 124 in Operation S180.

Next, in Operation S210, the mixed keyword determining unit 130 determines whether primary keyword $t_j$ is a mixed keyword based on a probability equal to the mixed keyword probability, and determines whether primary keyword $t_j$ is a related keyword based on a probability equal to the related keyword probability.

Next, in Operation S220, the assigning unit 140 assigns on a priority basis a primary keyword $t_j$ estimated to be a related keyword to a secondary topic in the same group (that is, for the same user d), and assigns a primary keyword $t_j$ estimated to be a mixed keyword to any topic.

For example, the assigning unit 140 may determine whether to assign a primary keyword $t_j$ in the same group estimated to be a related keyword to any in response to the ratios of secondary keywords in the secondary user data classified according to each topic.

For example, the assigning unit 140 may determine whether to assign a primary keyword $t_j$ estimated to be a mixed keyword to a topic without regard to the ratios of secondary keywords in the secondary user data classified according to each topic.

In one example, the assigning unit 140 may acquire secondary user data from the storage unit 102, and use Equation (10) and Equation (11) to determine that topic $c_j$ will be assigned to the primary keyword $t_j$. In other words, when primary keyword $t_j$ is a related keyword, the assigning unit 140 assigns the $k^{th}$ topic ($1 \leq k \leq K$) to the primary keyword $t_j$ as the primary topic $c_j$ using the probability on the left side $P(c_j=k|r_j=1, Z, W, T, C_{\setminus j}, R_{\setminus j}; \alpha, \beta, \gamma, \eta)$, which is proportional to the equation on the right side in Equation (10).

Equation 10

$$P(c_j = k \mid r_j = 1, Z, W, T, C_{\setminus j}, R_{\setminus j}; \alpha, \beta, \gamma, \eta) \propto \frac{M_{k,t_j\setminus j} + \gamma}{M_{k\setminus j} + T\gamma} \frac{N_{k,d}}{N_d} \quad \text{Equation (10)}$$

$M_{k, t_j\setminus j}$ represents the number of primary keywords (excluding $t_j$ itself) that are the same as primary keyword $t_j$ in the data for all users and that have been assigned to the $k^{th}$ topic k, $M_{k\setminus j}$ represents all primary keywords in the data for all users (excluding primary keyword $t_j$ itself) that have been assigned to the $k^{th}$ topic k, and T represents the number of different primary keywords in the data for all users. Parameter $\gamma$ may be a predetermined common value for all primary keywords, or may be a value $\gamma_t$ determined in advance for each primary keyword.

When the primary keyword $t_j$ is a related keyword, as indicated by the term $N_{k,d}/N_d$ in Equation (10), the topic most commonly assigned to secondary keywords grouped with the primary keyword $t_j$ is more likely to be assigned by the assigning unit 140 as the new primary topic. Therefore, when primary keyword $t_j$ is a related keyword, the new primary topic depends on the number of topics assigned to the secondary keywords (that is, secondary document information such as the content of posts).

When the primary keyword $t_j$ is a mixed keyword, the assigning unit 140 assigns the $k^{th}$ topic ($1 \leq k \leq K$) to the primary keyword $t_j$ as the new primary topic $c_j$ based on the probability on the left side $P(c_j=k|r_j=0, Z, W, T, C_{\setminus j}, R_{\setminus j}; \alpha, \beta, \gamma, \eta)$, which is proportional to the equation on the right side in Equation (11).

Equation 11

$$P(c_j = k \mid r_j = 0, Z, W, T, C_{\setminus j}, R_{\setminus j}; \alpha, \beta, \gamma, \eta) \propto \frac{M_{k,t_j\setminus j} + \gamma}{M_{k\setminus j} + T\gamma} \quad \text{Equation (11)}$$

Equation (11) does not include the term $N_{k,d}/N_d$. Therefore, when the primary keyword $t_j$ is a mixed keyword, the new primary topic is assigned to the primary keyword $t_j$ without regard to the number of topics assigned to secondary keywords (that is, to secondary document information such as the content of posts).

Here, because the primary topic $c_j$ assigned to the primary keyword $t_j$ of user d by the assigning unit 140 is not a dedicated topic for mixed keywords, the same topic as a primary topic $c_j$ assigned to primary keywords t, of other users as related keywords is assigned as the primary topic $c_j$. Therefore, the assigning unit 140 can properly assign topics to primary keywords that are mixed keywords for some users and related keywords for other users. The assigning unit 140 updates the primary user data in the storage unit 102 to reflect the topics assigned to primary keywords.

In Operation 230 of the first loop processing, the information processing device 10 updates the first overall data set, the second overall data set, the third overall data set, and the tertiary user data.

For example, the primary keyword appearance calculating unit 150 calculates the likelihood of a primary keyword appearing in each topic of primary document information for all users. The primary keyword appearance calculating unit 150 stores in the storage unit 102 a first overall data set Ψ recording the likelihood of a primary keyword appearing for each topic.

In one example, the primary keyword appearance calculating unit 150 uses Equation (12) to calculate real value $\Psi_{k,t}$, which indicates the likelihood of the $t^{th}$ primary keyword t (where t is equal to or greater than 1) in the $k^{th}$ topic k (where k is a predetermined integer between 1 and K inclusive) appearing in the primary document information of all users, and K sets of T-dimensional real-value vectors are generated from $\Psi_{k,t}$, where k=1 through K and t=1 through T, as the first overall data set Ψ.

Equation 12

$$\psi_{k,t} = \frac{M_{k,t} + \gamma}{M_k + \sum_{t=1}^{T} \gamma}$$

Equation (12)

Figure 7:
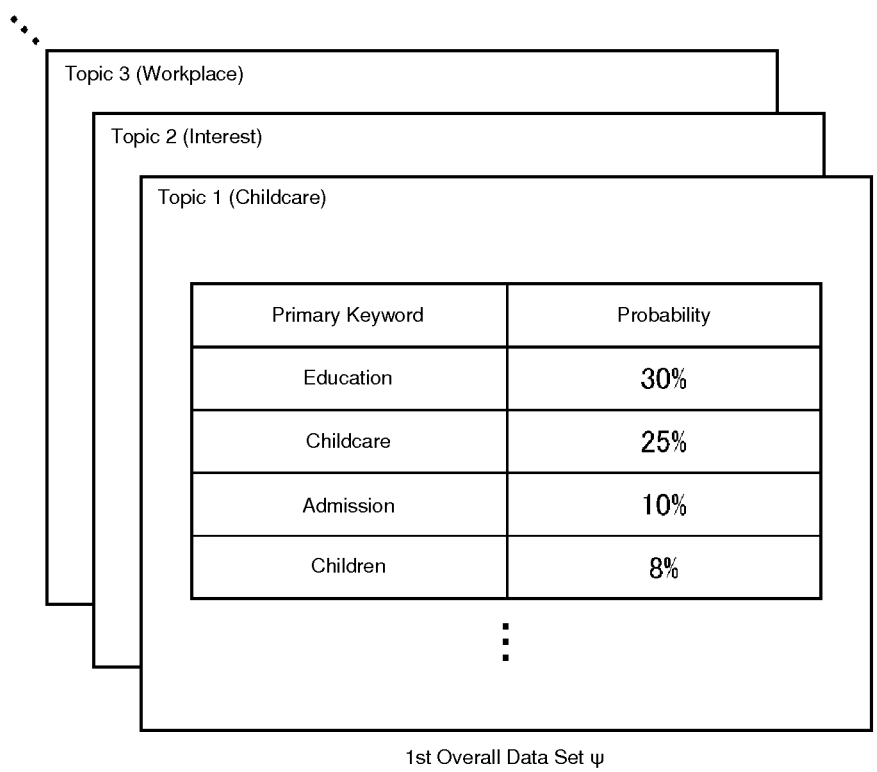
FIG. 7 is an example of a first overall data set Ψ generated by the topic probability generating unit 160.

FIG. 7 is an example of a first overall data set Ψ generated by the primary keyword appearance calculating unit 150. As shown in the drawing, the primary keyword appearance calculating unit 150 may generate a first overall data set Ψ representing the probability of a primary keyword being generated by each topic.

For example, the primary keyword appearance calculating unit 150 may generate a first overall data set Ψ indicating that the probability of generating the primary keyword "education" from topic 1 (for example, a topic related to childcare) is 30%, the probability of generating the secondary keyword "childcare" from topic 1 is 25%, the probability of generating the primary keyword "admission" from topic 1 is 10%, and the probability of generating the primary keyword "children" from topic 1 is 8%. The first overall data set Ψ does not have to include the probability of a primary keyword being generated; it may include a standard value for the likelihood of another primary keyword being generated.

Returning to FIG. 2, in Operation S230, the topic probability generating unit 160 calculates the likelihood for each secondary topic of a secondary keyword appearing in the secondary document information of all users. The topic probability generating unit 160 stores in the storage unit 102 a second overall data set φ in which the likelihood of a second keyword appearing is registered for each topic.

In one example, the topic probability generating unit 160 uses Equation (13) to calculate real value $\varphi_{k,w}$, which indicates the likelihood of the $w^{th}$ secondary keyword for the $k^{th}$ topic k appearing, and K sets of W-dimensional real-value vectors are generated from $\varphi_{k,w}$, where k=1 through K and w=1 through W, as the second overall data set φ.

Equation 13

$$\varphi_{k,w} = \frac{n_{k,w} + \beta}{n_k + \sum_{w=1}^{W} \beta}$$

Equation (13)

Parameter β may be a predetermined common value for all secondary keywords, or may be a value $\beta_w$ determined in advance for each secondary keyword.

Figure 8:
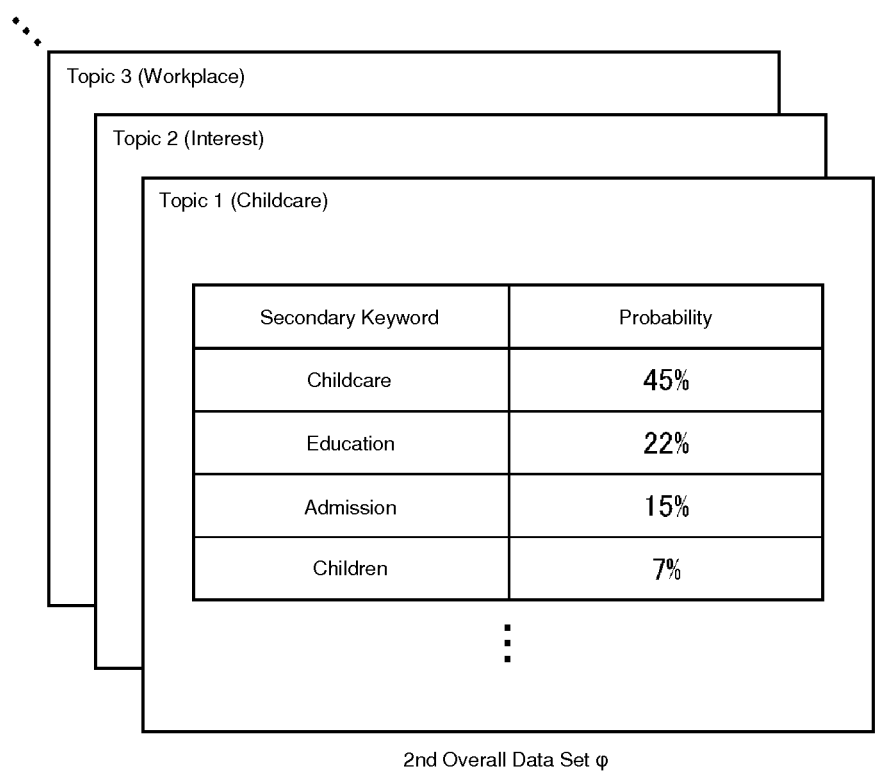
FIG. 8 is an example of a second overall data set Φ generated by the topic probability generating unit 160.

FIG. 8 is an example of a second overall data set Φ generated by the topic probability generating unit 160. As shown in the drawing, the topic probability generating unit 160 may generate a second overall data set Φ representing the probability of a secondary keyword being generated by each topic. For example, the topic probability generating unit 160 may generate a second overall data set φ indicating that the probability of generating the secondary keyword "childcare" from topic 1 (for example, a topic related to childcare) is 45%, the probability of generating the secondary keyword "education" from topic 1 is 22%, the probability of generating the secondary keyword "admission" from topic 1 is 15%, and the probability of generating the secondary keyword "children" from topic 1 is 7%. The second overall data set φ does not have to include the probability of a secondary keyword being generated; it may include a standard value for the likelihood of another secondary keyword being generated.

In Operation S230 of FIG. 2, the topic probability generating unit 160 generates the probability that each topic will be generated in the secondary document information of each user. The topic probability generating unit 160 stores in the storage unit 102 a third user data set θ in which the probability of a topic being generated by each user is recorded.

For example, the topic probability generating unit 160 uses Equation (14) to calculate the probability $\theta_{d,k}$ of the $k^{th}$ topic k being generated in secondary document information d (where d is between 1 and the total number D of secondary document information sets) related to the $d^{th}$ user, and D sets of K-dimensional real-value vectors are generated from $\theta_{d,k}$, where k=1 through K and d=1 through D, as the third overall data set θ. The process of deriving Equation (14) is described in Non-Patent Document 2.

Equation 14

$$\theta_{d,k} = \frac{N_d^{(k)} + \alpha}{N_d + \sum_{k=1}^{K} \alpha}$$

Equation (14)

Parameter α may be a predetermined common value for all topics, or may be a value $\alpha_k$ determined in advance for each topic.

Figure 9:
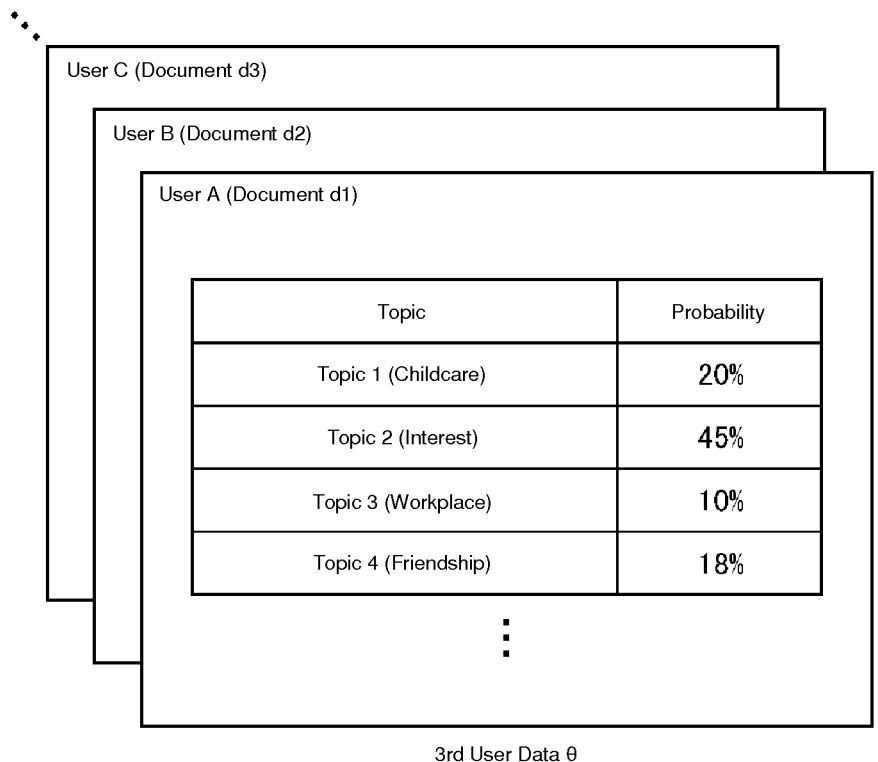
FIG. 9 is an example of tertiary user data θ generated by the topic probability generating unit 160.

FIG. 9 is an example of tertiary user data θ generated by the topic probability generating unit 160. As shown in the drawing, the topic probability generating unit 160 may generate a third user data set θ representing the probability of each topic being generated in secondary document information for each user. For example, the topic probability generating unit 160 generates a third user data set θ indicating that the probability of user A generating topic 1 is 20%, the probability of generating topic 2 is 45%, the probability of generating topic 3 is 10%, and the probability of generating topic 4 is 18%. The third overall data set θ does not have to include the probability of a topic being generated; it may include a standard value for the likelihood of another topic being generated.

In Operation S230 of FIG. 2, the mixed-related keyword percentage calculation unit 170 generates a third overall data set λ indicating the percentage of mixed keywords to all primary keywords for all users. For example, the mixed-related keyword percentage calculation unit 170 generates, as the third overall data set λ, a real value between 0 and 1 that is calculated from primary user data to indicate the percentage of mixed keywords among the total number of primary keywords of all users based on the number of primary keywords for all users deemed to be related keywords, and the number of primary keywords for all users deemed to be mixed keywords. The mixed-related keyword percentage calculation unit 170 stores the third overall data set λ in the storage unit 102.

In Operation S240, the primary keyword generation probability calculating unit 180 calculates a primary keyword generation probability representing the probability of a primary keyword being assigned to the secondary document information. For example, the primary keyword generation probability calculating unit 180 calculates the primary keyword generation probability on the basis of the tertiary user data θ and the first overall data set Ψ.

In one example, the primary keyword generation probability calculating unit 180 uses Equation (15) to calculate the primary keyword generation probability $P(t|d, D)$ of the $t^{th}$ primary keyword being assigned to secondary document information d related to the $d^{th}$ user by calculating $\theta_{dk}\Psi_{kt}$ for each topic k in the secondary document information d.

Equation 15

$$P(t \mid d, D) = \sum_{k} \hat{\theta}_{dk} \hat{\psi}_{kt} \qquad \text{Equation (15)}$$

In other words, the primary keyword generation probability calculating unit 180 generates the primary keyword generation probability $P(t|d, D)$ by multiplying the probability $\theta_{d,k}$ of the $k^{th}$ topic k being generated by user d and the likelihood $\Psi_{k,t}$ of the $t^{th}$ primary keyword appearing for the $k^{th}$ topic k, and then calculating the product for k=1, . . . , K to obtain the sum total. The primary keyword generation probability calculating unit 180 stores the primary keyword generation probabilities in the storage unit 102.

Figure 10:
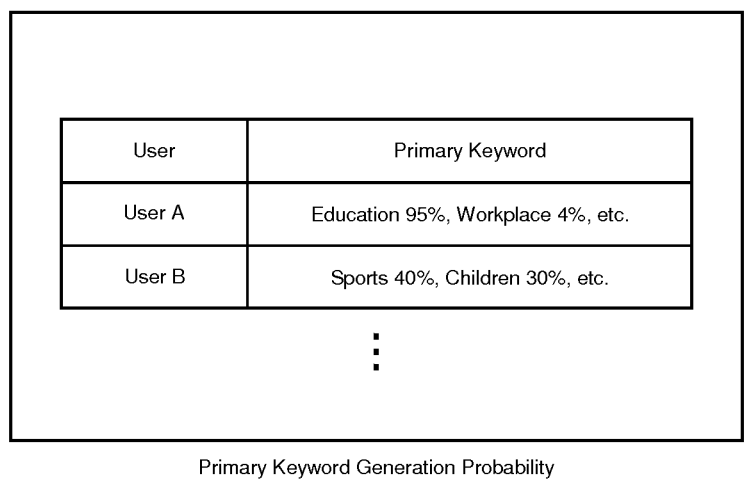
FIG. 10 is an example of a primary keyword generation probability generated by the primary keyword generation probability calculating unit 180.

FIG. 10 is an example of a primary keyword generation probability generated by the primary keyword generation probability calculating unit 180. As shown in the drawing, the primary keyword generation probability calculating unit 180 may generate a primary keyword generation probability including the probability of each primary keyword being generated by each user. For example, the primary keyword generation probability calculating unit 180 may generate a primary keyword generation probability indicating that there is a 95% probability of primary keyword "education" being generated and a 4% probability of primary keyword "workplace" occurring in secondary document information from user A, and that there is a 40% probability of primary keyword "sports" being generated and a 30% probability of primary keyword "children" occurring in secondary document information from user B.

After topics have been provisionally assigned to primary keywords and secondary keywords in the initialization process, the information processing device 10 in the present embodiment repeats the second loop processing inside the first loop processing to update the assignment of topics to the primary keywords and secondary keywords of each user. In this way, the information processing device 10 can improve the accuracy of topic assignments to the primary keywords and the secondary keywords.

When a primary keyword is a mixed keyword, the information processing device 10 assigns to the primary keyword a topic already assigned to a primary keyword that is a related keyword and does not assign a dedicated topic for mixed keywords to the primary keyword. In this way, the information processing device 10 can properly assign topics to a primary keyword when the primary keyword is a mixed keyword for one user and a related keyword for another user.

Figure 11:
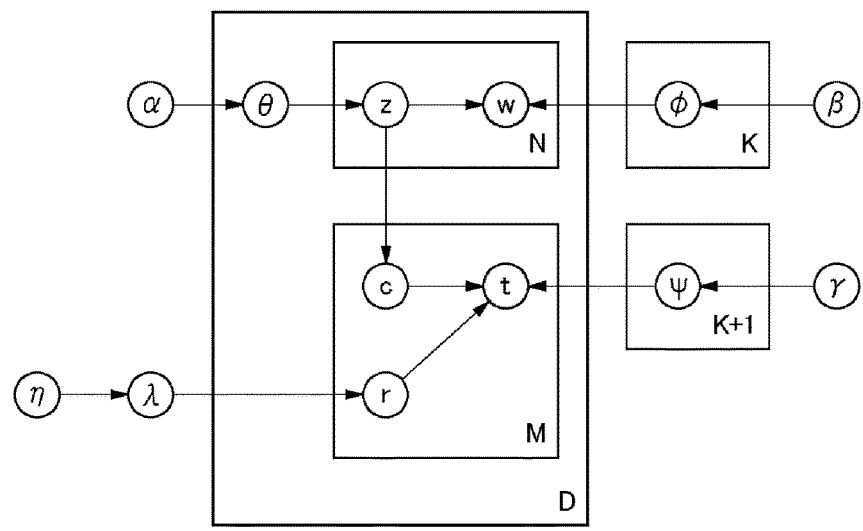
FIGS. 11(a) and 11(b) are examples of a topic model related to the present embodiment.
Figure 11:
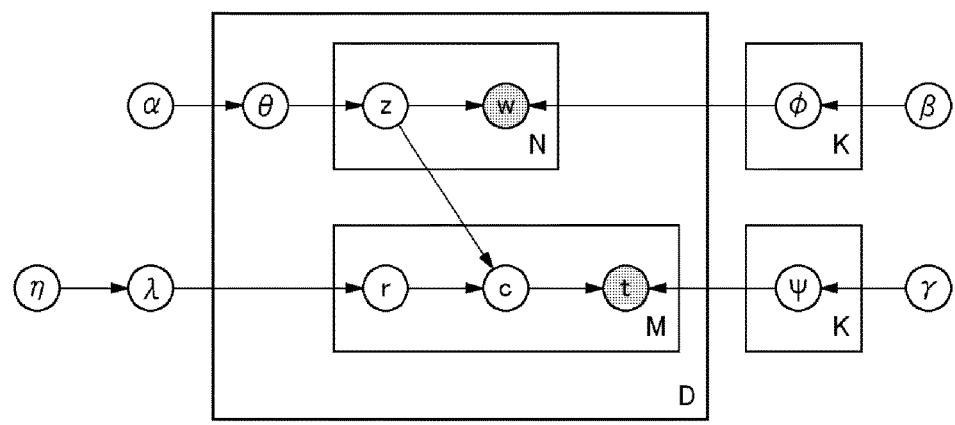

FIG. 11 is an example of a topic model related to the present embodiment. FIG. 11 (a) shows a topic model using the technique in Non-Patent Literature 2, and FIG. 11 (b) shows the topic model in the present embodiment.

Here, z relates to a topic generating a secondary keyword. When a primary keyword is a related keyword generated by the $1^{st}$ through $K^{th}$ topics, r is 1. When a primary keyword is a mixed keyword generated by the $0^{th}$ topic used for noise, flag r is 0. When flag r is 1, c is an integer value from 1 to K related to the topic generating the primary keyword, w is a secondary keyword extracted from secondary document information N, and t is a primary keyword extracted from primary document information M.

Also, θ is the topic generation probability for user D (K-dimensional real-value vectors for the number of topics), λ is the percentage of mixed keywords among all of the primary keywords (a real-number value between 0 and 1, inclusive), φ is the probability of each topic for all users generating each secondary keyword (W-dimensional real-number value vector for the total number of keywords×the number of topics K), and Ψ is the probability of each topic for all users generating a primary keyword (T-dimensional real-number value vector for the total number of primary keywords×K or K+1).

As shown in FIG. 11 (a) and FIG. 11 (b), parameter α impacts the tertiary user data θ, parameter η impacts the third overall data set λ, parameter β impacts the second overall data set Φ, and parameter γ impacts the first overall data set Ψ. As shown in the drawings, secondary keyword w is generated from topic z, and topic c is generated from topic z.

In the model related to Non-Patent Literature 2 shown in FIG. 11 (a), primary keyword t is generated from topic c and flag r. In other words, primary keyword t is a mixed keyword generated from flag r (r=0) or a related keyword generated from flag r (r=1) and topic c (c=1 through K).

In the model related to the present embodiment shown in FIG. 11 (b), primary keyword t is generated from topic c, and topic c is generated from flag r and topic z. In other words, primary keyword t is assigned to any one (1 through K) of the topics c regardless of whether the primary keyword t is a mixed keyword or a related keyword.

The information processing device 10 in the present embodiment does not have to be used to estimate primary keywords such as tags that are to be assigned to a user based on, for example, the content of a social media service. It can also be applied to FAQ searches. For example, the information processing device 10 acquires the question "What can I do to switch over to the terminal made by Company X?" as secondary document information, acquires primary keywords corresponding to the secondary document information, and searches a FAQ document including the primary keywords to output FAQ text including an answer to the question.

The information processing device 10 can also acquire question Q as primary document information (or a primary keyword), and the answer A as secondary document information (or a secondary keyword) to estimate the question Q corresponding to the answer A (or the keyword used in the question Q).

Figure 12:
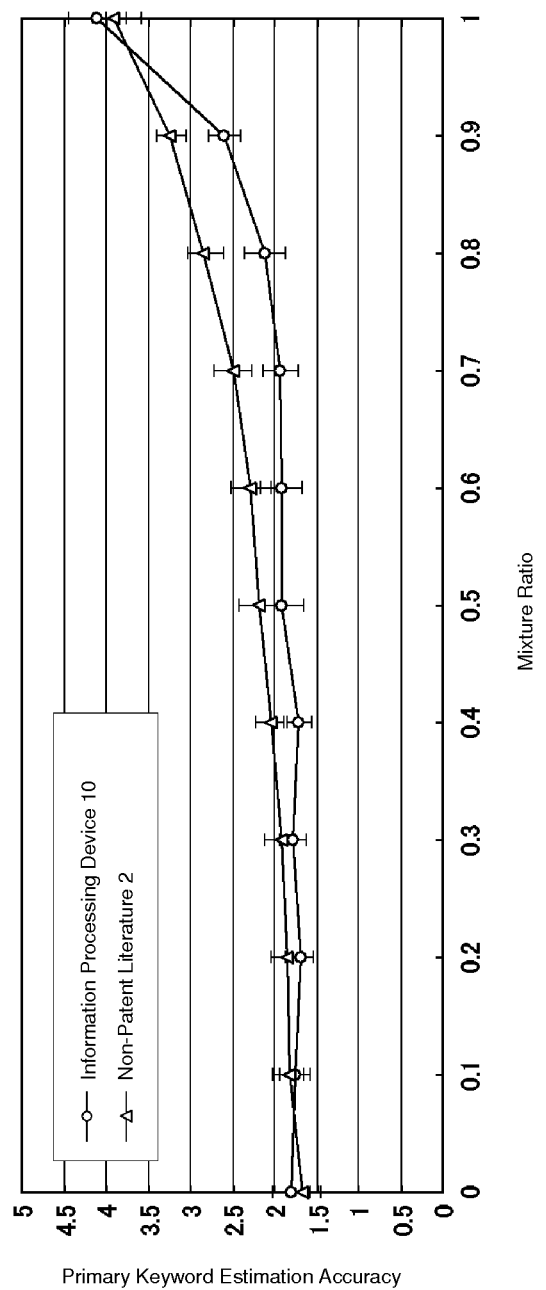
FIG. 12 is a graph showing the effectiveness of the information processing device 10 in the present embodiment.

FIG. 12 is a graph showing the effectiveness of the information processing device 10 in the present embodiment. FIG. 12 shows the results from estimating primary keywords corresponding to secondary document information using the method performed by the information processing device in the present invention and the method described in Non-Patent Literature 2. In this test, groups of primary document information and secondary document information known to contain relative keywords and mixed keywords were used.

The vertical axis of the graph indicates the primary keyword estimation accuracy. A lower value indicates higher primary keyword estimation accuracy. The horizontal axis of the graph indicates the percentage of mixed keywords in the groups of primary document information and secondary document information to be processed. In the graph, the results obtained from the method performed by the information processing device 10 are plotted using circles, and the results obtained from the method in Non-Patent Literature 2 are plotted using triangles.

It is clear from FIG. 12 that the primary keyword estimation accuracy of the information processing device 10 is higher than the method of Non-Patent Literature 2 in every respect. In other words, the information processing device 10 can learn secondary document information and the primary keywords corresponding to the secondary document information with greater accuracy. The results of the information processing device 10 are especially superior when the percentage of mixed keywords ranges from 20% to 90%.

Figure 13:
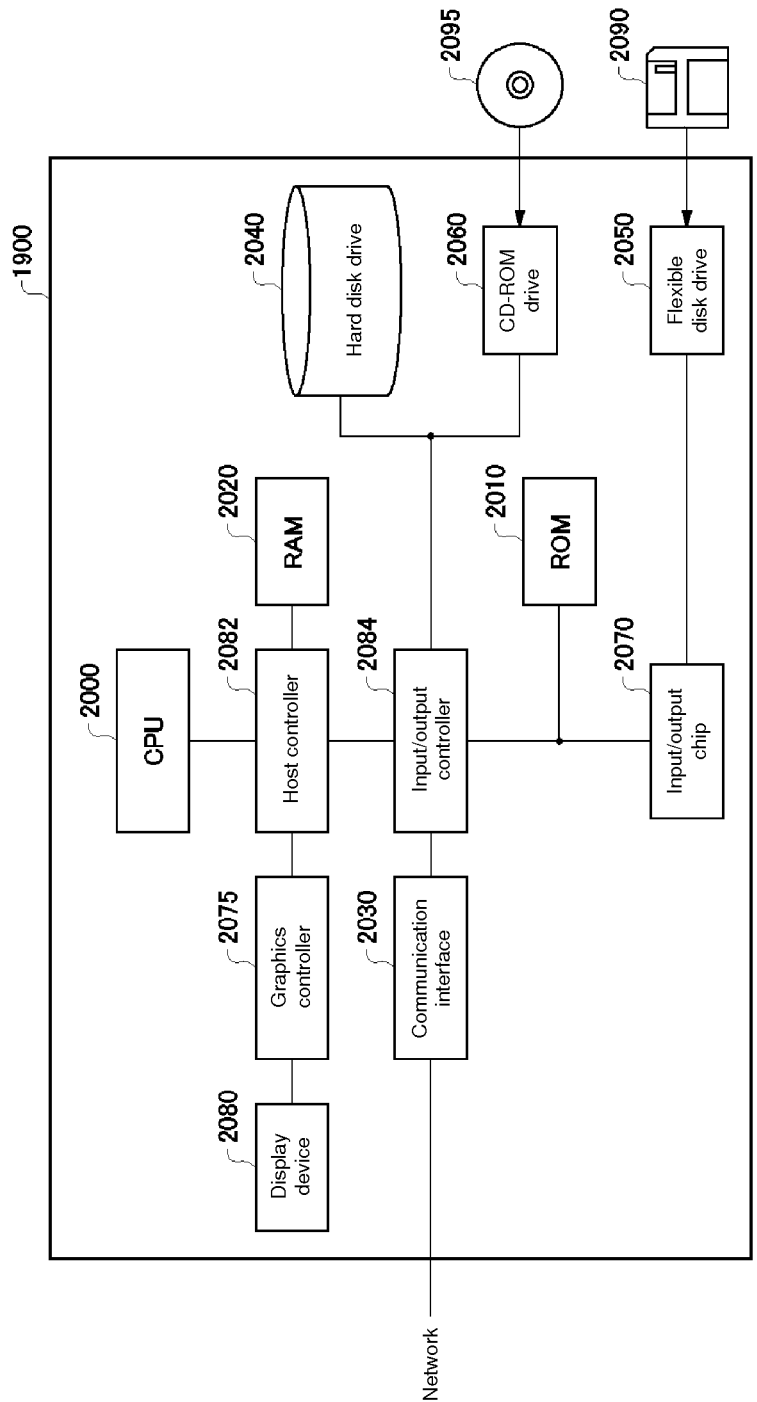
FIG. 13 shows an example of a hardware configuration of a computer 1900.

FIG. 13 shows an example of a hardware configuration for the computer 1900 functioning as the information processing device 10 in the present embodiment. The computer 1900 in the present embodiment is equipped with a CPU peripheral portion having a CPU 2000, RAM 2020, graphics controller 2075 and display device 2080 connected to each other by a host controller 2082, an input/output portion having a communication interface 2030, a hard disk drive 2040 and a CD-ROM drive 2060 connected to the host controller 2082 by an input/output controller 2084, and a legacy input/output portion having a ROM 2010, flexible disk drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display device 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, a hard disk drive 2040, and a CD-ROM drive 2060. The communication interface 2030 communicates with the other devices via a wired or wireless network. The hard disk drive 2040 stores the programs and data used by the CPU 2000 in the computer 1900. The CD-ROM drive 2060 reads programs and data from the CD-ROM 2095 and provides them to the hard disk drive 2040 via the RAM 2020.

The input/output controller 2084 is connected to the ROM 2010, the flexible disk drive 2050, and the relatively low-speed input/output device of the input/output chip 2070. The ROM 2010 stores the boot program executed by the computer 1900 at startup and/or programs relying on hardware in the computer 1900. The flexible disk drive 2050 reads programs or data from a flexible disk 2090, and provides the programs and data to the hard disk drive 2040 via the RAM 2020. The input/output chip 2070 connects the flexible disk drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a flexible disk 2090, CD-ROM 2095 or IC card, and provided by the user. A program is read from the recording medium, installed in the hard disk drive 2040 inside the computer 1900 via the RAM 2020, and executed by the CPU 2000.

Programs installed in the computer 1900 and causing the computer 1900 to function as the information processing device 10 include the keyword acquiring module, storage module, initializing module, classifying module, estimating module, topic acquiring module, match calculating module, mixed keyword ratio acquiring module, mixed keyword probability calculating module, mixed keyword determining module, assigning module, primary keyword appearance calculating module, topic probability generating module, mixed-related keyword percentage calculation module, and primary keyword generation probability calculating module. These programs or modules may work with the CPU 2000 and other components to cause the computer 1900 to function as keyword acquiring unit 100, storage unit 102, initializing unit 110, classifying unit 112, estimating unit 120, topic acquiring unit 122, match calculating unit 124, mixed keyword ratio acquiring unit 126, mixed keyword probability calculating unit 128, mixed keyword determining unit 130, assigning unit 140, primary keyword appearance calculating unit 150, topic probability generating unit 160, mixed-related keyword percentage calculation unit 170, and primary keyword generation probability calculating unit 180.

The information processing written in these programs are specific means activated by reading the programs to the computer 1900 so that the software cooperates with the various types of hardware resources described above. These specific means function as the keyword acquiring unit 100, storage unit 102, initializing unit 110, classifying unit 112, estimating unit 120, topic acquiring unit 122, match calculating unit 124, mixed keyword ratio acquiring unit 126, mixed keyword probability calculating unit 128, mixed keyword determining unit 130, assigning unit 140, primary keyword appearance calculating unit 150, topic probability generating unit 160, mixed-related keyword percentage calculation unit 170, and primary keyword generation probability calculating unit 180. These specific means realize operations and the processing of information in the computer 1900 of the present embodiment to construct a specific information processing device 10 for this intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, flexible disk 2090 or CD-ROM 2095, or writes reception data received from the network to a reception buffer region of the storage device. In this way, the communication interface 2030 transfers transmitted and received data to a storage device using the direct memory access (DMA) method. Alternatively, the CPU 2000 transfers transmitted and received data by reading data from the source storage device or communication interface 2030, and transfers and writes data to the destination communication interface 2030 or storage device.

Also, the CPU 2000 writes all of the data or the necessary data to the RAM 2020 via, for example, a DMA transfer, from files or databases stored in the storage unit 102 or another external storage device such as a hard disk drive 2040, a CD-ROM drive 2060 (CD-ROM 2095) or a flexible disk drive 2050 (flexible disk 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device.

The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine.

The CPU 2000 can also retrieve information stored in files and databases inside the memory device. For example, when a plurality of entries associating an attribute value for a second attribute to an attribute value for a first attribute, the CPU 2000 can retrieve an entry matching the conditions indicated by the attribute value of the first attribute among the plurality of entries stored in the storage device, and then obtain the attribute value of the second value associated with the first value satisfying a predetermined condition by reading the attribute value of the second attribute stored in the entry.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using such terms as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

REFERENCE SIGNS LIST

10: Information processing device
100: Keyword acquiring unit
102: Storage unit
110: Initializing unit
112: Classifying unit
120: Estimating unit
122: Topic acquiring unit
124: Match calculating unit
126: Mixed keyword ratio acquiring unit
128: Mixed keyword probability calculating unit
130: Mixed keyword determining unit
140: Assigning unit
150: Primary keyword appearance calculating unit
60: Topic probability generating unit
170: Mixed-related keyword percentage calculating unit
180: Primary keyword generation probability calculating unit
900: Computer
2000: CPU
2010: ROM
2020: RA
2030: Communication interface
2040: Hard disk drive
2050: Flexible disk drive
2060: CD-ROM drive
2070: Input/output chip
2075: Graphics controller
2080: Display device
2082: Host controller
2084: Input/output controller
2090: Flexible disk
2095: CD-ROM

The invention claimed is:

1. An information processing method executed by a computer, the method comprising:
   acquiring a plurality of primary keyword and secondary keyword groups;
   acquiring primary document information including more than one primary keyword, and secondary document information including more than one secondary keyword created by a first user;

classifying each of the plurality of secondary keywords by a plurality of topics based on a topic model, the topics being units for grouping a plurality of keywords having a threshold probability of appearing together in document information;

estimating whether each primary keyword in the plurality of groups is a related keyword related to any topic having a classified secondary keyword or a mixed keyword unrelated to any of the topics on the basis of primary topics having assigned primary keywords and secondary topics having assigned secondary keywords, the estimating comprising:

acquiring a primary topic of the primary keyword;

calculating the extent of the topic match being the proportion of secondary topics assigned to one or more secondary keywords that are the same as the primary topic;

acquiring the mixed keyword ratio or the ratio of primary keywords estimated to be mixed keywords among primary keywords included in primary document information from all users; and calculating the mixed keyword probability of the primary keyword being a mixed keyword on the basis of the extent of the topic match and the mixed keyword ratio; and assigning a primary keyword estimated to be a related keyword to a topic having a classified secondary keyword in the same group, and assigning a primary keyword estimated to be a mixed keyword to any of the topics for classification instead of a dedicated mixed keyword topic such that the primary keyword can later be assigned to a topic if determined to be a related keyword for a different user than the first user.

2. The method of claim 1, further comprising:

determining a topic to assign a primary keyword estimated to be a related keyword on the basis of the proportion of secondary keywords classified by each topic in the same group; and determining a topic to assign a primary keyword estimated to be a mixed keyword irrespective of the proportions.

3. The method of claim 1, further comprising determining whether a primary keyword is a related keyword or a mixed keyword on the basis of the mixed keyword probability.

4. The method of claim 1, further comprising calculating the likelihood $\Psi_{kt}$ of the $t^{th}$ primary keyword t, wherein t is an integer >1, appearing in the $k^{th}$ topic, wherein k is a predetermined integer >1, in all sets of primary document information from a user.

5. The method of claim 4, further comprising generating the probability $\theta_{dk}$ of the $k^{th}$ topic k in each set of secondary document information d, wherein d>1 but less than the total number of sets of secondary document information being generated.

6. The method of claim 5, further comprising calculating a primary keyword generation probability P(t|d, D) of a primary keyword t being assigned to a single set of secondary document information d by totaling the $\theta_{dk} \Psi_{kt}$ of each topic k in the set of secondary document data d.

* * * * *